(12) United States Patent
Chen

(10) Patent No.: US 10,458,508 B1
(45) Date of Patent: Oct. 29, 2019

(54) FRONT FORK SHOCK-ABSORBING DEVICE AND METHOD FOR CONTROLLING THE SAME

(71) Applicant: LIOW KO CO., LTD., Changhwa (TW)

(72) Inventor: Cheng Chung Chen, Changhwa (TW)

(73) Assignee: Liow Ko Co., Ltd., Changhwa (TW)

( * ) Notice: Subject to any disclaimer, the term of this patent is extended or adjusted under 35 U.S.C. 154(b) by 11 days.

(21) Appl. No.: 15/995,353

(22) Filed: Jun. 1, 2018

(30) Foreign Application Priority Data

Apr. 12, 2018 (TW) .............................. 107112625 A

(51) Int. Cl.
| | |
|---|---|
| *B62K 25/08* | (2006.01) |
| *F16F 9/46* | (2006.01) |
| *B62K 21/02* | (2006.01) |
| *B62K 25/04* | (2006.01) |

(52) U.S. Cl.
CPC .............. *F16F 9/463* (2013.01); *B62K 21/02* (2013.01); *B62K 25/08* (2013.01); *B62K 2025/048* (2013.01)

(58) Field of Classification Search
CPC .......... F16F 9/462; F16F 9/467; B60G 17/08; B60K 25/08
USPC .......... 188/266.5, 282.4, 319.1; 280/275, 276
See application file for complete search history.

(56) References Cited

U.S. PATENT DOCUMENTS

| | | | | |
|---|---|---|---|---|
| 3,827,538 | A * | 8/1974 | Morgan ................... | F16F 9/467 188/319.1 |
| 4,463,839 | A * | 8/1984 | Ashiba ..................... | F16F 9/462 188/282.4 |
| 4,683,992 | A * | 8/1987 | Watanabe .............. | B60G 17/08 188/266.5 |
| 8,196,947 | B2 * | 6/2012 | Achenbach ............ | B62K 25/08 280/276 |
| 8,910,963 | B2 * | 12/2014 | Battlogg ................ | B62K 25/08 188/267.1 |
| 2014/0062056 | A1 * | 3/2014 | Battlogg ................ | B62K 25/08 280/276 |
| 2014/0191491 | A1 * | 7/2014 | Lude ...................... | B62K 25/08 280/276 |

* cited by examiner

*Primary Examiner* — Christopher P Schwartz
(74) *Attorney, Agent, or Firm* — Rosenberg, Klein & Lee

(57) ABSTRACT

A front fork shock-absorbing device includes a front fork and a shock-absorbing unit is located in the first space in the front fork. The shock-absorbing unit includes a driving unit and a spring rate adjustment device. The driving unit contacts an operation end of the spring rate adjustment device. A DC power unit is located in the second space of the front fork and electrically connected to the driving unit. The shock-absorbing unit provides shock-absorbing features to the front fork. The spring rate adjustment device is adjusted according to the road condition to provide comfortable riding to the users.

10 Claims, 9 Drawing Sheets

FRONT FORK SHOCK-ABSORBING DEVICE AND METHOD FOR CONTROLLING THE SAME

BACKGROUND OF THE INVENTION

1. Fields of the Invention

The present invention relates to a front fork shock-absorbing device, and more particularly, to a front fork shock-absorbing device and a method for remotely controlling the front fork shock-absorbing device.

2. Descriptions of Related Art

The conventional front shock-absorbing device allows the users to adjust the features of the front shock-absorbing device according the practical needs. Generally, the conventional includes a shock-absorbing member received in the front fork and the shock-absorbing member is controlled and adjusted by operation of a button or cable. This conventional front shock-absorbing device includes a complicated structure and high manufacturing cost.

The present invention intends to provide a front fork shock-absorbing device and a method for controlling and adjusting front fork shock-absorbing device remotely to eliminate the drawbacks mentioned above.

SUMMARY OF THE INVENTION

The present invention relates to a front fork shock-absorbing device and comprises a front fork which has an inner tube unit and an outer tube unit, and the inner tube unit is partially and retractably located in the outer tube unit. A resilient member is located between the inner tube unit and the outer tube unit. A first space is defined in one of the two legs of the front fork, and a second space is defined in the other leg of the front fork. A shock-absorbing unit is located in the first space and includes a driving unit and a spring rate adjustment device. The driving unit is connected to an operation end of the spring rate adjustment device. The driving unit includes a single receiving end to receive command signals to contact the operation end. A DC power unit is located in the second space and electrically connected to the driving unit. A remote-control device has a signal output end which outputs the command signals to the single receiving end of the driving unit to adjust the spring rate adjustment device.

The present invention also provides a method for controlling a front fork shock-absorbing device, and the method comprises:

a step of having a front fork shock-absorbing device: installing a driving unit and a spring rate adjustment device in a front fork of a bike, the driving unit contacting an operation end of the spring rate adjustment device, the driving unit including a single receiving end, the driving unit having a controller, a motor and an activation member, the controller driving the motor, the motor driving the activation member, the activation member contacting the operation end of the spring rate adjustment device, the inner tube unit being movable relative to the outer tube unit to change a first space defined in one of the two legs of the front fork, and a second space defined in the other leg of the front fork so as to adjust a spring rate of the resilient member;

a step of having a DC power unit: installing a DC power unit in the front fork, the DC power unit providing power to the driving unit, and a step of having a remote-control device: the remote-control device having a signal output end which outputs the command signals to the single receiving end of the driving unit to adjust the spring rate adjustment device.

Preferably, the driving unit includes a controller, a motor and an activation member. The controller drives the motor, and the motor drives the activation member, the activation member contacts the operation end of the spring rate adjustment device.

Preferably, the activation member includes a movable member and a fixed member. The movable member is movably located in the fixed member. A threaded section is formed between the outer surface of the movable member and the inner surface of the fixed member so that the movable member is movable relative to the fixed member by the threaded section.

Preferably, the controller includes a micro-control module, a decoding module, a motor-control module and a communication module. The micro-control module, the decoding module, the motor-control module and the communication module are electrically connected with each other. The communication module is a wireless communication module, a blue-tooth communication module or a cabled communication module.

Preferably, the remote-control device is installed to a bike. The remote-control device is a gauge or a control device which outputs the command signals to the driving unit by a wireless way or a cabled method.

Preferably, the remote-control device is a smart phone which outputs the command signals to the driving unit by way of wireless.

Preferably, the DC power unit is a one-time battery, a two-time use battery or a power generation unit. The inner tube unit is moved relative to the outer tube unit to change the first space and the second space so as to adjust a spring rate of the resilient member.

Preferably, the micro-control module sends the command signals, according to a result of the decoding module, to the motor-control module to control revolution per minute of the motor.

Preferably, the controller examines the front fork shock-absorbing device when the remote-control device is activated, and the controller sends signals to the remote-control device. The decoding module of the controller analyzes the command signals of the remote-control device so as to drive the motor, and feeds back signal of the motor to the controller.

The advantages of the present invention are that the command signals sent by the remote-control device by wireless way or by cabled way are decoded to precisely control the revolution per minute of the motor and the activation member so as to adjust the spring rate of the resilient member, such that the users can adjust the adjust the shock-absorbing device of the front fork to have a comfortable riding experience.

The present invention does not use complicated mechanical structure to achieve the purposes of shock absorbing. The present invention is simplified and easily manufactured at low cost.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
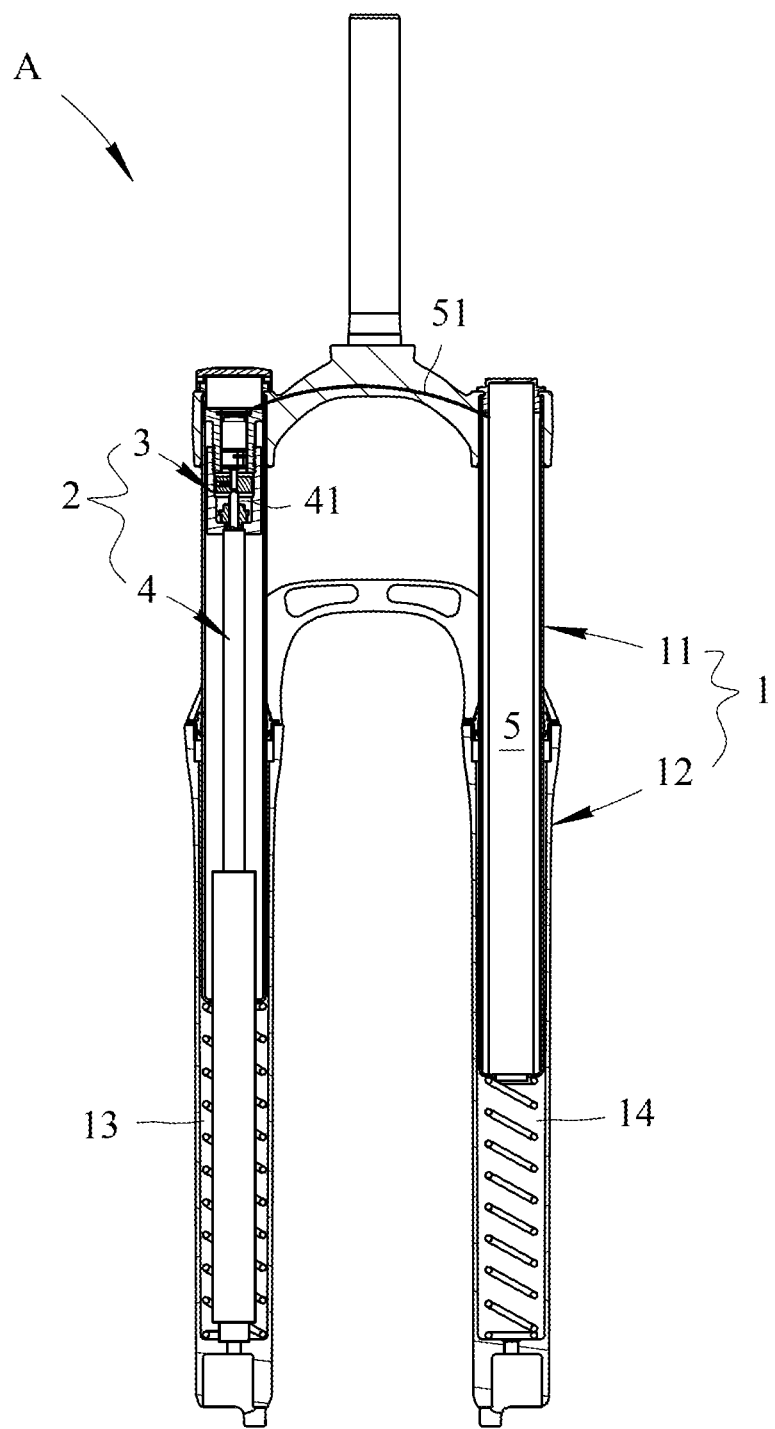
FIG. 1 is a cross sectional view of the front fork shock-absorbing device of the present invention.

Referring to FIGS. 1 to 4, the front fork shock-absorbing device "A" of the present invention comprises a front fork 1 having two legs and a crown portion connected between the two legs. An inner tube unit 11 and an outer tube unit 12 are received in each of the two legs, wherein the inner tube unit 11 partially and retractably located in the outer tube unit 12. Multiple resilient members 15 are located between the inner tube unit 11 and the outer tube unit 12. In this embodiment, the resilient members 15 are springs. A first space 13 is defined in one of the two legs of the front fork, and a second space is defined in the other leg of the front fork. The inner tube unit 11 includes holes for cables passing therethrough.

Figure 2:
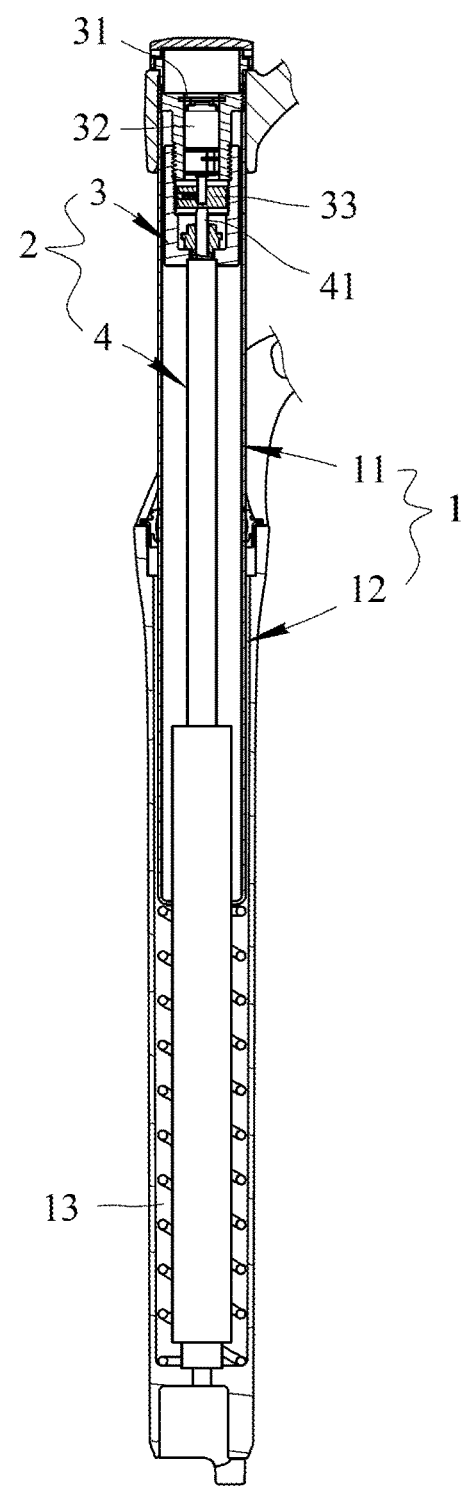
FIG. 2 is a side cross sectional view of the front fork shock-absorbing device of the present invention.

A shock-absorbing unit 2 as disclosed in FIG. 2 is located in the first space 13 to provide shock-absorbing feature to the front fork 1. The shock-absorbing unit 2 includes a driving unit 3 and a spring rate adjustment device 4, wherein the driving unit 3 is connected to an operation end 41 of the spring rate adjustment device 4 to adjust the length of the spring rate adjustment device 4. The driving unit 3 includes a single receiving end to receive command signals to contact the operation end 41.

Figure 3:
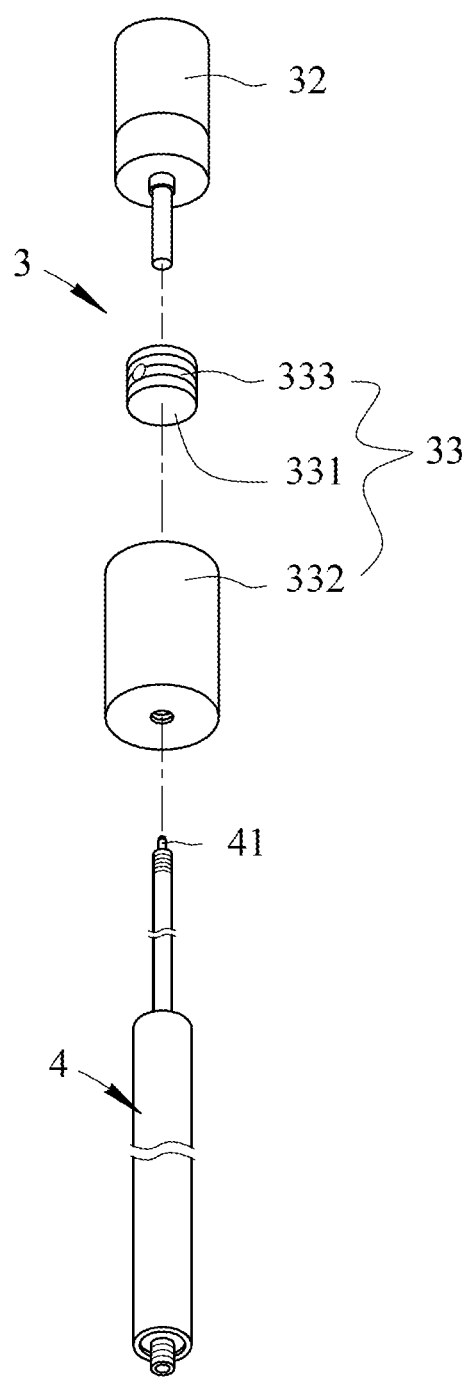
FIG. 3 is an exploded view of the shock-absorbing unit of the present invention.
Figure 4:
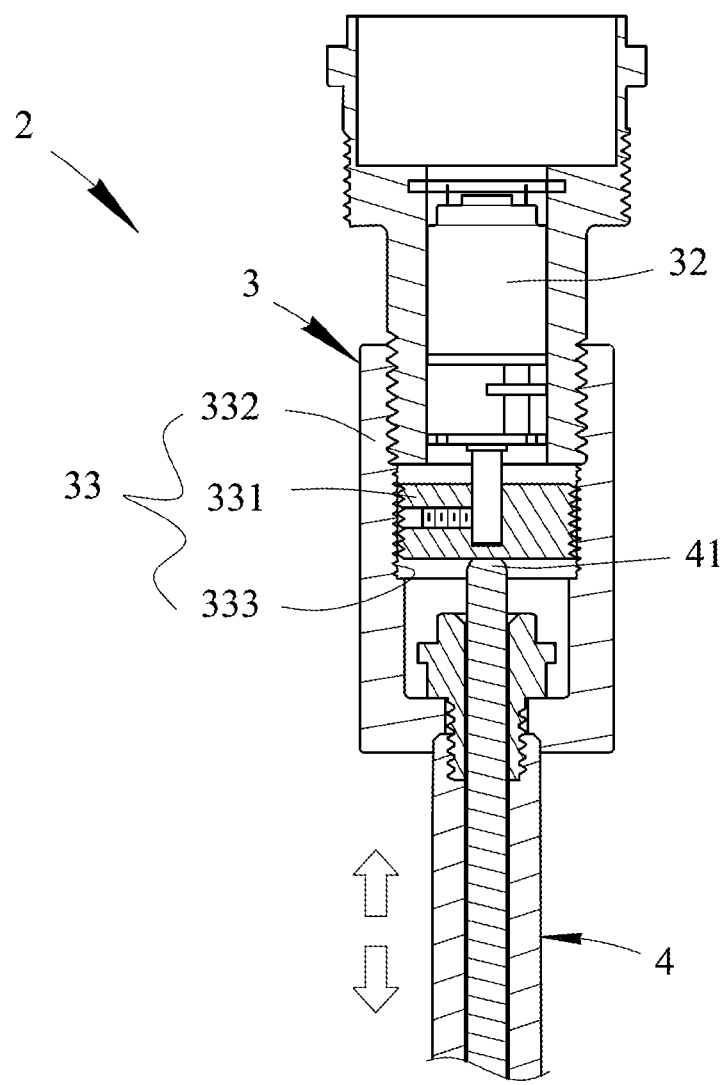
FIG. 4 is a side cross sectional view to show the operation of the front fork shock-absorbing unit of the present invention.

As disclosed in FIGS. 2 to 4, the driving unit 3 includes a controller 31, a motor 32 and an activation member 33. The controller 31 drives the motor 32, and the motor 32 drives the activation member 33. The activation member 33 then contacts the operation end 41 of the spring rate adjustment device 4. Furthermore, as disclosed in FIG. 4, the activation member 33 includes a movable member 331 and a fixed member 332. The movable member 331 is movably located in the fixed member 332. A threaded section 333 is formed between the outer surface of the movable member 331 and the inner surface of the fixed member 332 so that the movable member 331 is movable relative to the fixed member 332 by the threaded section 333.

Figure 5:
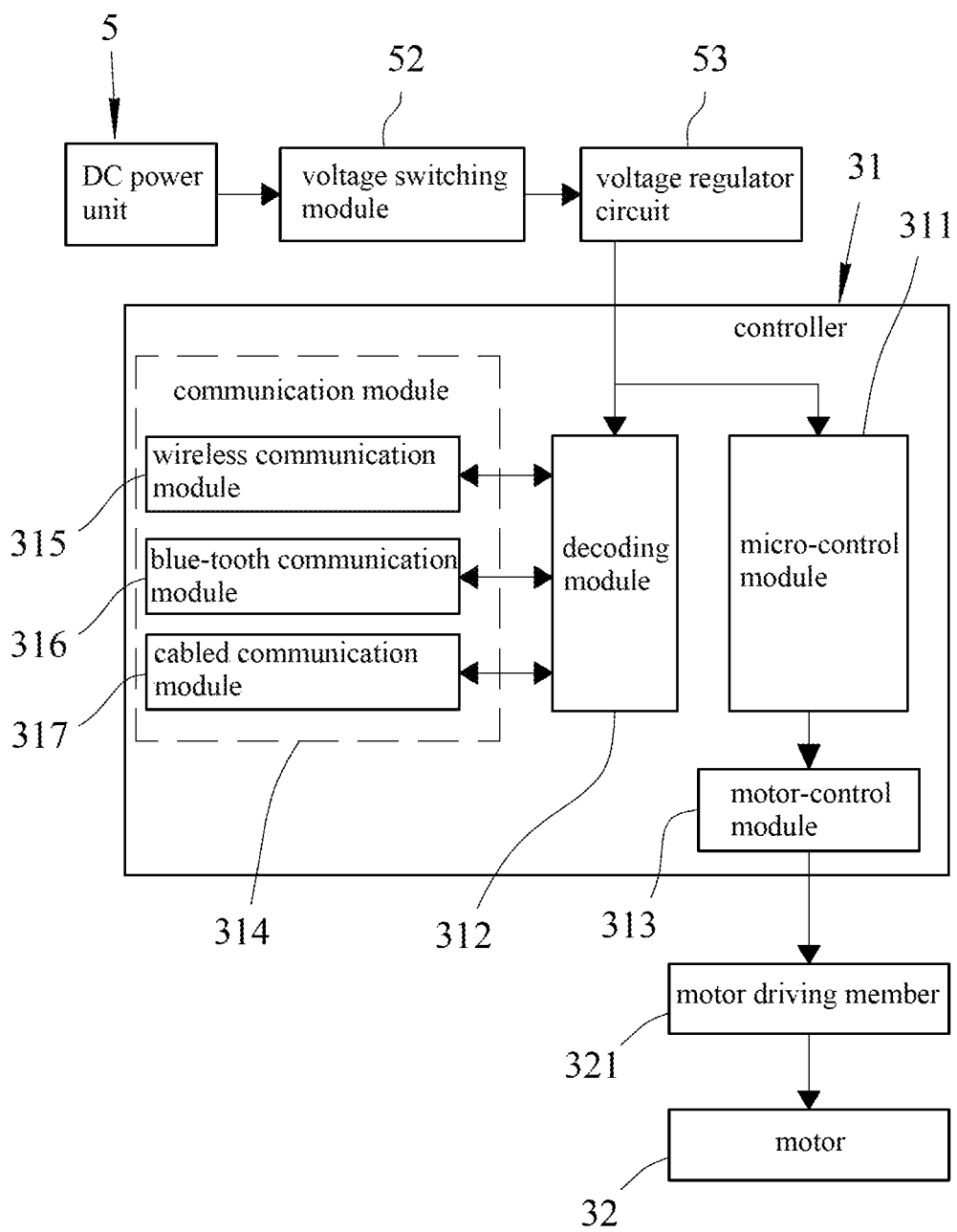
FIG. 5 illustrates the block diagram of the controller of the present invention.

As shown in FIG. 5, the controller 31 includes a microcontrol module 311, a decoding module 312, a motor-control module 313 and a communication module 314. The microcontrol module 311, the decoding module 312, the motor-control module 313 and the communication module 314 are electrically connected with each other. The communication module 314 is a wireless communication module 315, a blue-tooth communication module 316 or a cabled communication module 317 so as to receive the command signals set from remote in different ways. The command signals are then decoded by the decoding module 312, and the microcontrol module 311 sends the decoded signals to a motor driving member 321 of the motor 32 to command the motor-control module 313 to drive the motor 32. The motor 32 then drives the activation member 33 to contacts or press the operation end 41 to adjust the spring rate adjustment device 4.

As shown in FIGS. 2 and 3, the spring rate adjustment device 4 is a cylindrical device that has the operation end 41 extending from one end thereof, and the driving unit 3 contacts and is able to press the operation end 41. When the length of the spring rate adjustment device 4 is adjusted to be longer, then the first space 13 and the second space 14 are increased to release the resilient members 15, and the spring rate of the resilient members 15 is reduced. When the length of the spring rate adjustment device 4 is adjusted to be shorter, then the first space 13 and the second space 14 are decreased to compress the resilient members 15, and the spring rate of the resilient members 15 is increased. Therefore, the spring rate of the resilient members 15 can be adjusted in multiple stages. Therefore, the driving unit 3 compresses the operation end 41 to adjust or lock the spring rate adjustment device 4.

As shown in FIG. 5, a DC power unit 5 located in the second space 14 and electrically connected to the driving unit 3. A voltage switching module 52 and a voltage regulator circuit 53 provide electric power to the driving unit 3. The DC power unit 5 is a one-time battery, a two-time use battery or a power generation unit.

Figure 6:
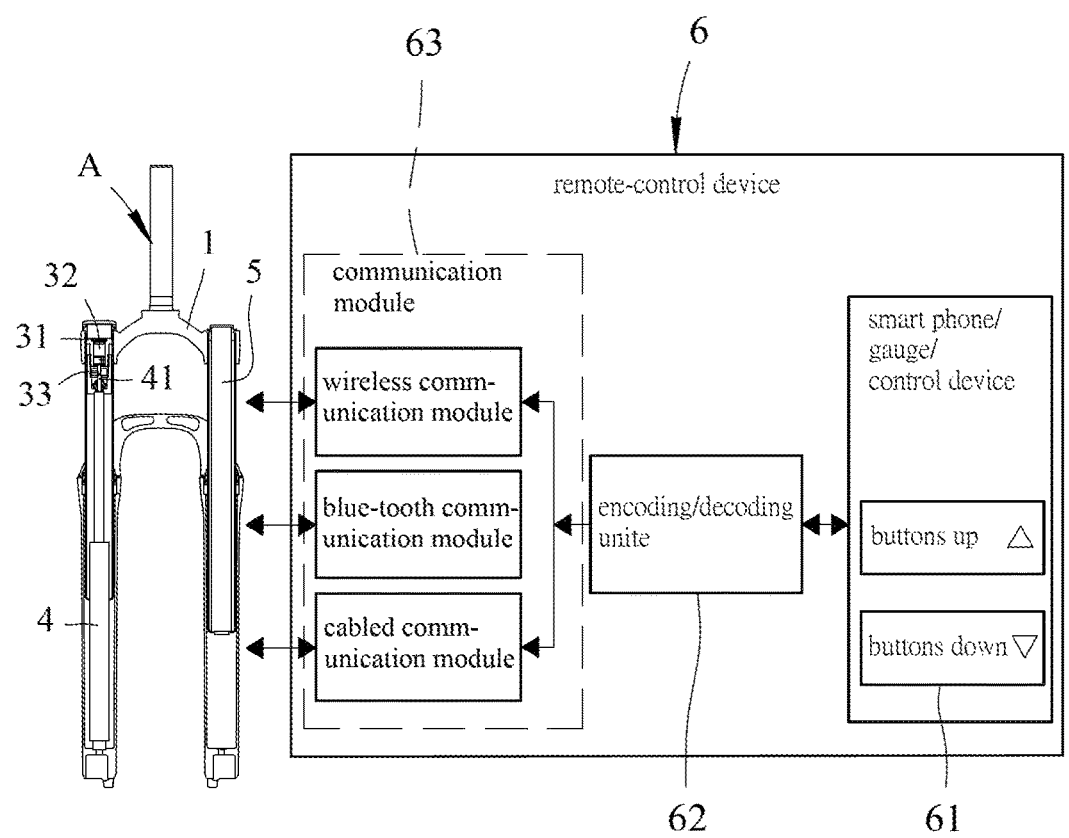
FIG. 6 illustrates the block diagram of the remote-control device of the present invention.
Figure 7:
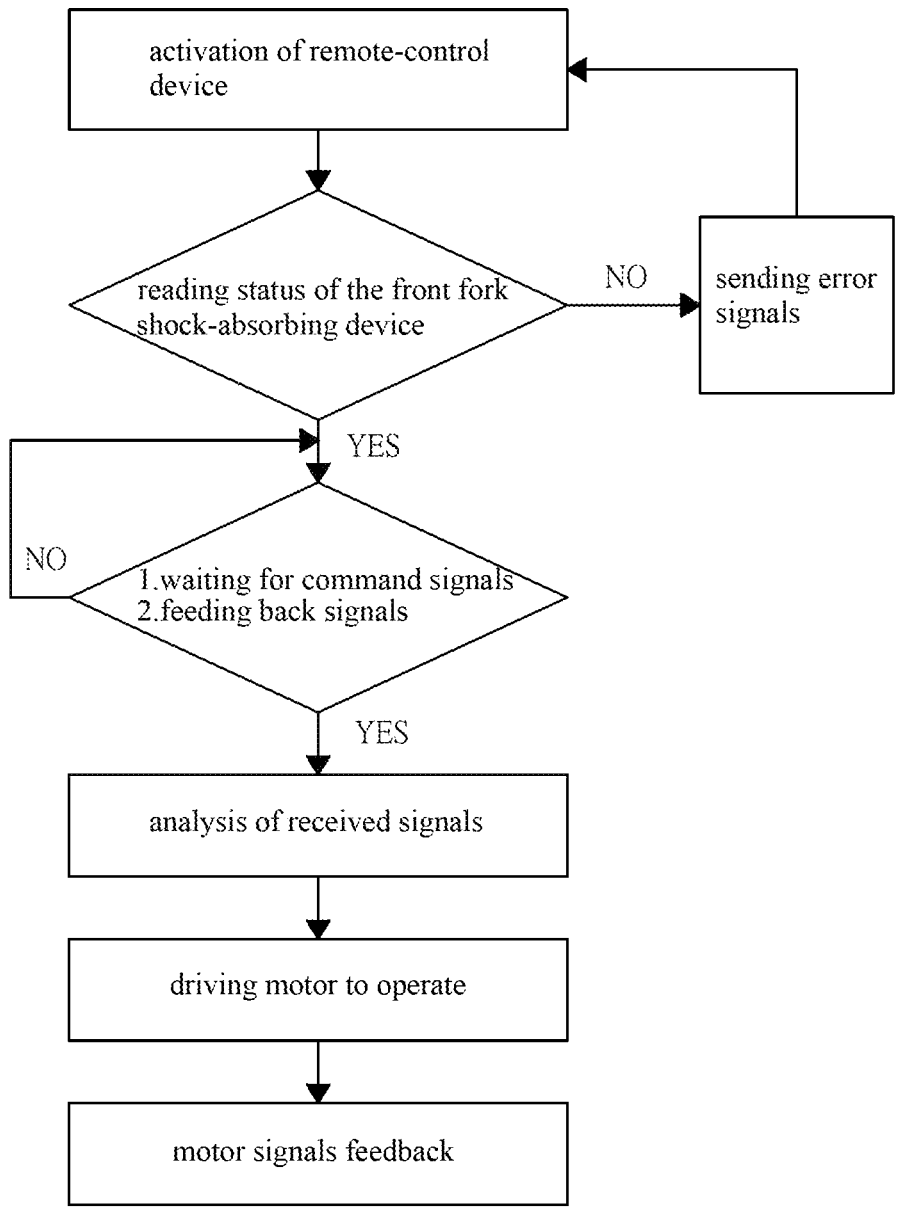
FIG. 7 shows the control steps of the controller of the present invention.

As shown in FIG. 6, a remote-control device 6 includes a signal output end which outputs the command signals to the single receiving end of the driving unit 3 to adjust the spring rate adjustment device 4. The remote-control device 6 is installed to a bike. The remote-control device 6 is a gauge or a control device which outputs the command signals to the driving unit 3 by a wireless way or a cabled method. The remote-control device 6 can also be a smart phone which outputs the command signals to the driving unit 3 by way of wireless or blue-tooth. The users may operate the buttons 61 of the smart phone, the gauge or the control device to send command signals to the encoding/decoding unit 62, and the command signals are then decoded into digital signals which are sent to the driving unit 3 by the communication module 63 including the wireless communication module 315, the blue-tooth communication module 316 or the cabled communication module 317 in a wireless way to adjust the spring rate adjustment device 4 in the front fork 1.

As shown in FIGS. 4 to 7, the controller 31 examines the front fork shock-absorbing device "A" when the remote-control device 6 is activated. When the front fork shock-absorbing device "A" has problems, the error signal will be sent back to the remote-control device 6. When the front fork shock-absorbing device "A" is in a normal status, the controller 31 waits for the command signals from the remote-control device 6. In other words, the controller 31 is able to wait for the command signals and to feed back to the remote-control device 6. When the command signals are issued from the remote-control device 6, the decoding module 312 of the controller 31 decodes the command signals and commands the motor 32 to operate. In the meanwhile, the signals form the motor 32 is fed back to the controller 31 to complete the adjustment of the front fork shock-absorbing device "A" in multiple stages.

Figure 8:
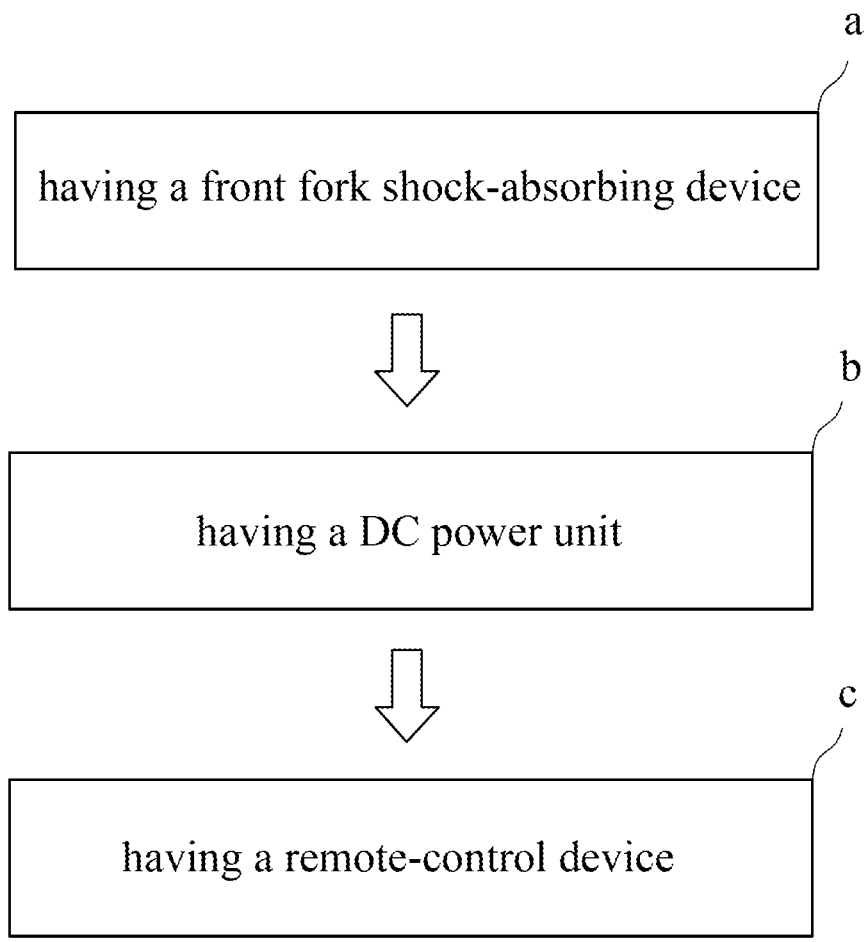
FIG. 8 shows the steps of the method for using the front fork shock-absorbing device of the present invention.

As shown in FIG. 8, the present invention provides a method "B" for controlling a front fork shock-absorbing device, and the method comprises:

a step "a" of having a front fork shock-absorbing device: installing a driving unit 3 and a spring rate adjustment device 4 in a front fork 1 of a bike, the driving unit 3 contacting an operation end 41 of the spring rate adjustment device 4, the driving unit 3 including a single receiving end, the driving unit 3 having a controller 31, a motor 32 and an activation member 33, the controller 31 driving the motor 32, the motor 32 driving the activation member 33, the activation member 33 contacting the operation end 41 of the spring rate adjustment device 4, the inner tube unit 11 being movable relative to the outer tube unit 12 to change a first space 13 defined in one of the two legs of the front fork, and a second space defined in the other leg of the front fork so as to adjust a spring rate of the resilient member 15;

a step "b" of having a DC power unit 5: installing a DC power unit 5 in the front fork 1, the DC power unit 5 providing power to the driving unit 3, and a step "c" of having a remote-control device 6: the remote-control device 6 having a signal output end which outputs the command signals to the single receiving end of the driving unit 3 to adjust the spring rate adjustment device 4.

The controller 31 includes a micro-control module 311, a decoding module 312, a motor-control module 313 and a communication module 314. The micro-control module 311 sends the command signals, according to a result of the decoding module 312, to the motor-control module 313 to control revolution per minute of the motor 32.

The controller 31 examines the front fork shock-absorbing device "A" when the remote-control device 6 is activated, and the controller 31 sends signals to the remote-control device 6, the decoding module 312 of the controller 31 analyzes the command signals of the remote-control device 6 so as to drive the motor 32, and feeds back signal of the motor 32 to the controller 31.

Figure 9:
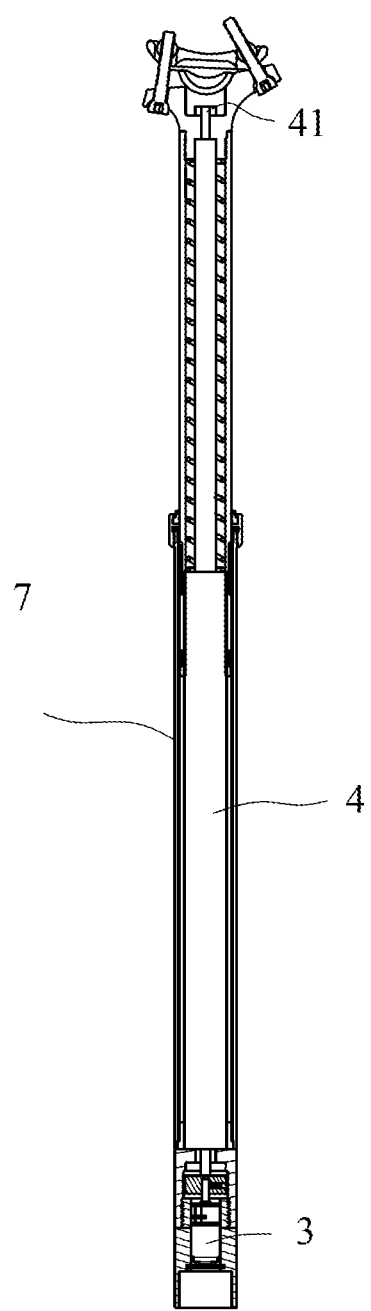
FIG. 9 shows the shock-absorbing device is used to a seat tube.

It is noted that the present invention can also be used to a seat tube 7 as shown in FIG. 9.

While we have shown and described the embodiment in accordance with the present invention, it should be clear to those skilled in the art that further embodiments may be made without departing from the scope of the present invention.

What is claimed is:

1. A front fork shock-absorbing device comprising:
   a front fork having a crown portion and two legs extending from the crown portion, an inner tube unit and an outer tube unit located in each of the two legs, the inner tube unit partially and retractably located in the outer tube unit, a resilient member located between the inner tube unit and the outer tube unit, a first space defined in one of the two legs of the front fork, and a second space defined in the other one of the two legs of the front fork;
   a shock-absorbing unit located in the first space and including a driving unit and a spring rate adjustment device, the driving unit connected to an operation end of the spring rate adjustment device, the driving unit including a single receiving end to receive command signals to contact the operation end;
   a DC power unit located in the second space and electrically connected to the driving unit, and
   a remote-control device having a signal output end which outputs the command signals to the single receiving end of the driving unit to adjust the spring rate adjustment device.

2. The front fork shock-absorbing device as claimed in claim 1, wherein the driving unit includes a controller, a motor and an activation member, the controller drives the motor, and the motor drives the activation member, the activation member contacts the operation end of the spring rate adjustment device.

3. The front fork shock-absorbing device as claimed in claim 2, wherein the activation member includes a movable member and a fixed member, the movable member is movably located in the fixed member, a threaded section is formed between an outer surface of the movable member and an inner surface of the fixed member so that the movable member is movable relative to the fixed member by the threaded section.

4. The front fork shock-absorbing device as claimed in claim 2, wherein the controller includes a micro-control module, a decoding module, a motor-control module and a communication module, the micro-control module, the decoding module, the motor-control module and the communication module are electrically connected with each other, the communication module is a wireless communication module, a blue-tooth communication module or a cabled communication module.

5. The front fork shock-absorbing device as claimed in claim 1, wherein the remote-control device is adapted to be installed to a bike, the remote-control device is a gauge or a control device which outputs the command signals to the driving unit by a wireless way or a cabled method.

6. The front fork shock-absorbing device as claimed in claim 1, wherein the remote-control device is a smart phone which outputs the command signals to the driving unit by way of wireless.

7. The front fork shock-absorbing device as claimed in claim 1, wherein the DC power unit is a one-time battery, a two-time use battery or a power generation unit, the inner tube unit is moved relative to the outer tube unit to change the first space and the second space so as to adjust a spring rate of the resilient member.

8. A method for controlling a front fork shock-absorbing device, comprising:
   a step of having a front fork shock-absorbing device: installing a driving unit and a spring rate adjustment device in a front fork of a bike, the driving unit contacting an operation end of the spring rate adjustment device, the driving unit including a single receiving end, the driving unit having a controller, a motor and an activation member, the controller driving the motor, the motor driving the activation member, the activation member contacting the operation end of the spring rate adjustment device, the inner tube unit being movable relative to the outer tube unit to change a first space defined in the inner tube unit, and a second space defined between the inner tube unit and the outer tube unit so as to adjust a spring rate of the resilient member;
   a step of having a DC power unit: installing a DC power unit in the front fork, the DC power unit providing power to the driving unit, and
   a step of having a remote-control device: the remote-control device having a signal output end which outputs the command signals to the single receiving end of the driving unit to adjust the spring rate adjustment device.

9. The method as claimed in claim 8, wherein the controller includes a micro-control module, a decoding module, a motor-control module and a communication module, the micro-control module sends the command signals, according to a result of the decoding module, to the motor-control module to control revolution per minute of the motor.

10. The method as claimed in claim 9, wherein the controller examines the front fork shock-absorbing device when the remote-control device is activated, and the controller sends signals to the remote-control device, the decoding module of the controller analyzes the command signals of the remote-control device so as to drive the motor, and feeds back signal of the motor to the controller.

* * * * *